US009068103B2

(12) United States Patent
Dickens

(10) Patent No.: US 9,068,103 B2
(45) Date of Patent: Jun. 30, 2015

(54) WATERPROOF SILANE-ENDCAPPED ADHESIVE MIXTURE

(76) Inventor: Carroll Benford Dickens, Santa Ana, CA (US)

(*) Notice: Subject to any disclaimer, the term of this patent is extended or adjusted under 35 U.S.C. 154(b) by 555 days.

(21) Appl. No.: 13/365,850

(22) Filed: Feb. 3, 2012

(65) Prior Publication Data
US 2013/0131244 A1 May 23, 2013

Related U.S. Application Data

(60) Provisional application No. 61/439,271, filed on Feb. 3, 2011.

(51) Int. Cl.
| | | |
|---|---|---|
| *C08G 18/08* | (2006.01) | |
| *C08K 5/24* | (2006.01) | |
| *C08K 3/26* | (2006.01) | |
| *C08K 5/54* | (2006.01) | |
| *C08K 3/00* | (2006.01) | |
| *C09J 175/04* | (2006.01) | |
| *C08K 5/10* | (2006.01) | |
| *C08K 5/5425* | (2006.01) | |
| *C09J 9/00* | (2006.01) | |
| *C09J 11/04* | (2006.01) | |
| *C09J 11/06* | (2006.01) | |
| *C08K 5/01* | (2006.01) | |

(52) U.S. Cl.
CPC ............... *C09J 175/04* (2013.01); *C08K 3/26* (2013.01); *C08K 5/10* (2013.01); *C08K 5/5425* (2013.01); *C08K 5/01* (2013.01); *C08K 2003/265* (2013.01); *C09J 9/00* (2013.01); *C09J 11/04* (2013.01); *C09J 11/06* (2013.01)

(58) Field of Classification Search
USPC .................. 524/264, 425, 730, 773, 788, 589
See application file for complete search history.

(56) References Cited

U.S. PATENT DOCUMENTS

| | | | |
|---|---|---|---|
| 5,225,512 A | 7/1993 | Baghdachi et al. | |
| 5,373,050 A | 12/1994 | Morikawa et al. | |
| 6,001,946 A | 12/1999 | Waldman et al. | |
| 2005/0137323 A1* | 6/2005 | Roesler et al. | 524/589 |
| 2006/0124225 A1* | 6/2006 | Wu et al. | 156/108 |
| 2006/0270770 A1* | 11/2006 | Feng et al. | 524/268 |
| 2008/0057316 A1 | 3/2008 | Landon et al. | |
| 2008/0146695 A1* | 6/2008 | Nefzger et al. | 523/109 |

FOREIGN PATENT DOCUMENTS

| | | |
|---|---|---|
| CA | 2753125 A1 | 9/2010 |
| EP | 0601021 A1 | 8/1992 |
| EP | 1697436 B1 | 12/2004 |

* cited by examiner

*Primary Examiner* — Aiqun Li

(57) ABSTRACT

A polymeric matrix adhesive comprising a prepolymer urethane, a silane added to the prepolymer urethane, the silane reacts with the urethane to at least partially end-cap the urethane to produce a silane end-capped urethane, an aliphatic quencher, a reinforcing extender; and a thixotropic agent, wherein the polymeric matrix adhesive is waterproof.

12 Claims, 2 Drawing Sheets

Table 1

Silanol condensation reaction where to inorganic substrate like concrete or modified flooring material.

Table 1

Silanol condensation reaction where to inorganic substrate like concrete or modified flooring material.

Table 2

| Silane Effectiveness | | Materials |
|---|---|---|
| ↑ | Excellent | Silica, Quartz, Glass, Aluminium, Copper, Alumina, Inorganics |
| | Good | Alumino-Silicates (clays), Mica, Talc, Inorganic Oxides, Steel, Iron, Asbestos |
| | Slight | Nickel, Zinc, Lead |
| | None | Chalk (Calcium Carbonate), Gypsum (Calcium Sulfate), Barytes (Barium Sulfate), Graphite, Carbon Black |

Additives that promote flooring material adhesion.

FIG. 2

WATERPROOF SILANE-ENDCAPPED ADHESIVE MIXTURE

CROSS REFERENCE

This application claims priority to U.S. provisional application Ser. No. 61/439,271 filed Feb. 3, 2011, the specification of which is incorporated herein by reference in its entirety.

BACKGROUND OF THE INVENTION

The present invention is directed to a waterproof adhesive, e.g., a formulated silane end-capped polyurethane adhesives. The adhesive may be used, for example, to form a chemical bond between flooring materials and substrates (e.g., concrete substrates).

SUMMARY

In some embodiments, the polymeric matrix adhesive of the present invention comprises a slow-cure urethane prepolymer; a flexible binder urethane prepolymer or a polyether polyol; an amino-functional alkoxysilane; an aliphatic metal catalyst; an aliphatic hydrocarbon quenching agent; a moisture scavenging agent; a reinforcing extender; and a thixotropic agent.

In some embodiments, the slow-cure urethane prepolymer has a % NCO content that achieves an optimum hardness and cure-time that allows for the elimination of the flexible binder urethane prepolymer or polyether polyol component. In some embodiments, the slow-cure urethane prepolymer comprises a % NCO content that requires the addition of the flexible binder urethane prepolymer or polyether polyol component to achieve an optimum hardness and cure-time.

In some embodiments, the polyether polyol has a molecular weight greater than about 4,000 g/mol. In some embodiments, the amino-functional alkoxysilane comprises gamma-aminopropyltrimethoxysilane. In some embodiments, the aliphatic metal catalyst comprises dibutyltindilaurate. In some embodiments, the aliphatic hydrocarbon quenching agent comprises a mixture of aliphatic fatty acid ester. In some embodiments, the moisture scavenger comprises vinyltrimethoxysilane. In some embodiments, the reinforcing extender comprises calcium carbonate. In some embodiments, the thixotropic agent comprises fumed silicate. In some embodiments, the mixture further comprises 3-glycidoxypropytrimethoxysilane. In some embodiments, the mixture further comprises a pigment.

In some embodiments, the percent weight of the slow-cure urethane prepolymer is between about 45 to 55%. In some embodiments, the percent weight of the slow-cure urethane prepolymer is about 50%. In some embodiments, the percent weight of the flexible binder urethane prepolymer is between about 30 to 40%. In some embodiments, the percent weight of the flexible binder urethane prepolymer is about 35%. In some embodiments, the percent weight of the aliphatic hydrocarbon quenching agent is between about 5 to 15%. In some embodiments, the percent weight of the reinforcing extender is between about 10 to 20%. In some embodiments, the percent weight of the reinforcing extender is about 15%. In some embodiments, the percent weight of the thixotropic agent is between about 10 to 20%.

The present invention also features a method of producing a polymeric matrix adhesive. In some embodiments, the method comprises combining under high speed dispersion: a slow-cure urethane prepolymer; a flexible binder urethane prepolymer or a polyether polyol; an amino-functional alkoxysilane; an aliphatic metal catalyst; an aliphatic hydrocarbon quenching agent; a moisture scavenging agent; a reinforcing extender; and a thixotropic agent.

The present invention also features a method of bonding a flooring material to a substrate. In some embodiments, the method comprises providing a polymeric matrix adhesive of the present invention, applying the polymeric matrix adhesive to a substrate, and fixing a flooring material to the substrate. In some embodiments, the substrate is concrete. In some embodiments, the flooring material is wood flooring, rubber flooring, or carpet tile.

The present invention also features a flooring material system. In some embodiments, the system comprises a flooring material; and an adhesion promoter, the adhesion promoter being selected from the group consisting of: silica, quartz, glass, aluminium, copper, alumina, alumino-silicate, mica, talk, an inorganic oxide, steel, iron, asbestos, nickel, zinc, lead, calcium carbonate, calcium sulfate, and barium sulfate.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 2 is a description showing additives that promote flooring material adhesion.

DESCRIPTION OF PREFERRED EMBODIMENTS

Figure 1:
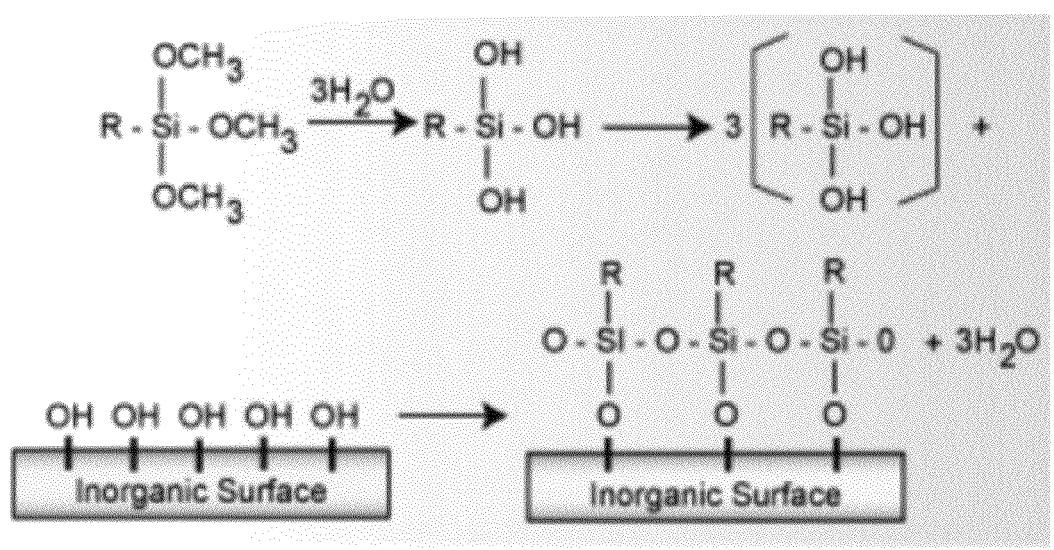
FIG. 1 is an illustration of a silanol condensation reaction.

Referring now to FIG. 1-2, the present invention features polymeric matrix adhesives. The adhesives of the present invention form a waterproof chemical bond between two materials, e.g., a flooring material and a substrate (e.g. concrete). The adhesives of the present invention form a waterproof chemical bond via a silanol-bridge mechanism, e.g., see FIG. 1. The adhesive bond that is formed is waterproof. In some embodiments, the adhesive bond that is formed is alkali stable to pH 14. Evaluation of concrete moisture according to ASTM F1869 may exceed 15 lbs/1000 sf/24 hrs and according to ASTM F2170 to 100% RH.

The adhesives of the present invention comprises a blend of prepolymer (e.g., urethane prepolymer) that is modified with a silane, e.g., a trimethoxy substituted amino functional silane, in the manufacturing process (e.g. in situ). In some embodiments, a mixture of naturally derived aliphatic fatty acid ester is used as a diluent/compatibilizer that assists in the incorporation of hydrophobically-treated calcium carbonates and hydrophobically-treated fumed silica viscosifiers. Final adhesive formulation viscosity may be adjusted to provide trowelability and overall aesthetic.

The adhesive of the present invention may form urethane and silanol condensation bonds, e.g., to the concrete surface and to the flooring material. Generally, the silanol condensation reaction is waterproof, solvent proof, and heat resistant. The cured adhesive creates a hydrophobic barrier to liquid water, yet allows water vapor and other gasses to move through the concrete/adhesive/flooring matrix.

Table 1 describes a non-limiting example of an adhesive of the present invention. Pigment is not required in order to obtain performance results. To achieve a waterproof, pH-resistant formulation, the incorporation of hydrophobically modified additives carried by an aliphatic hydrocarbon quenching agent may be necessary. The quencher may separate the urethanes (e.g., increase the activation energy so that the formulation is not reactive or has little reactivity). The dibutyltindilaurate is an aliphatic metal catalyst used in some embodiments to initiate cure of the adhesive by moisture. Substitution of the catalyst by other chemistries is possible. The silane (e.g., gamma-aminopropyltrimethoxysilane) end-caps the urethane prepolymers. In some embodiments, the catalyst is used to accelerate the reaction (e.g., the reaction in the presence of the catalyst may be allowed to react for between about 10 to 20 minutes, between about 15 to 20 minutes, between about 20 to 30 minutes, more than about 30 minutes, etc.). In some embodiments the catalyst is not used.

TABLE 1

| Component | Percent weight |
|---|---|
| Slow-cure urethane prepolymer | 50 |
| Flexible binder urethane prepolymer | 35 |
| Gamma-aminopropyltrimethoxysilane | 1.5 |
| Dibutyltindilaurate | 0.1 |
| Aliphatic fatty acid ester mixture | 10 |
| Vinyltrimethoxysilane | 0.7 |
| Reinforcing extender | 15 |
| Thixotropic agent | 15 |
| 3-glycidoxypropyltrimethoxysilane | 0.35 |
| Pigment | 0.2 |

Table 2, Table 2.1, and Table 2.2 describe non-limiting examples of an adhesive of the present invention. As previously stated, pigment is not required in order to obtain performance results.

TABLE 2

| Component | Percent weight |
|---|---|
| Slow-cure urethane prepolymer | 50 |
| Flexible binder urethane prepolymer | 35 |
| Silane (e.g., amino-functional alkoxysilane) | 1.5 |
| Catalyst (e.g., aliphatic metal catalyst) | 0.1 |
| Quenching agent (e.g., aliphatic hydrocarbon quenching agent) | 10 |
| Moisture scavenging agent | 0.7 |
| Reinforcing extender | 15 |
| Thixotropic agent | 15 |
| Pigment | 0.2 |

TABLE 2.1

| Component | Examples of Ranges of Percent weights |
|---|---|
| Silane end-capped polymeric material | 65-95 |
| Aliphatic quencher | 5-15 |
| Reinforcing extender | 5-15 |
| Thixotropic agent | 5-15 |

TABLE 2.1

| Component | Examples of Ranges of Percent weights |
|---|---|
| Urethane prepolymer | 65-95 |
| Silane (e.g., amino-functional alkoxysilane) | 0.5-5 |
| Aliphatic quencher | 5-15 |
| Reinforcing extender | 5-15 |
| Thixotropic agent | 5-15 |

Table 3 describes another non-limiting example of an adhesive of the present invention. A single urethane prepolymer possessing properties similar to the mixture of the slow-cure urethane prepolymer and the flexible binder urethane prepolymer used in the previous examples is substituted. Pigment is not required in order to obtain performance results.

TABLE 3

| Component | Percent weight |
|---|---|
| Urethane prepolymer | 85 |
| Silane (e.g., amino-functional alkoxysilane) | 1.5 |
| Catalyst (e.g., aliphatic metal catalyst) | 0.1 |
| Quenching agent (e.g., aliphatic hydrocarbon quenching agent) | 10 |
| Moisture scavenging agent | 0.7 |
| Reinforcing extender | 15 |
| Thixotropic agent | 15 |
| Pigment | 0.2 |

Table 4 describes another non-limiting example of an adhesive of the present invention. Pigment is not required in order to obtain performance results.

TABLE 4

| Component | Percent weight |
|---|---|
| Slow-cure urethane prepolymer | 45-55 |
| Flexible binder urethane prepolymer | 30-40 |
| Amino-functional alkoxysilane | 1-5 |
| Aliphatic metal catalyst | 0.05-5 |
| Aliphatic hydrocarbon quenching agent | 5-15 |
| Moisture scavenging agent | 0.1-1 |
| Reinforcing extender | 10-20 |
| Thixotropic agent | 10-20 |
| Pigment | 0-1 |

In some embodiments, the desired combination of reactivity and hardness properties of the slow-cure prepolymer and flexible binder urethane prepolymer mixture may be achieved by a single slow-cure urethane prepolymer component with a suitable % NCO content. In some embodiments, the desired combination of reactivity and hardness properties of the slow-cure urethane prepolymer and flexible binder urethane prepolymer mixture may be achieved by blending the two components, each with its own specific % NCO content. For example, a slow-cure urethane prepolymer with about 15.8% NCO content can be mixed with a flexible binder urethane prepolymer with about 9.7% NCO content to achieve a desired reactivity and hardness properties that result from the blend.

Alternatively, a single urethane prepolymer (a custom prepolymer) (e.g., with a % NCO content similar to the resulting % NCO content of the two-component urethane prepolymer mixture, or with a % NCO content less than or greater than the resulting % NCO content of the two-component urethane prepolymer mixture) could be used to achieve a desired reactivity and hardness properties. For example, a urethane prepolymer with a % NCO content of about 12% NCO could have workable reactivity and hardness properties, thereby eliminating the need to blend two separate components.

In some embodiments, the percent weight of the slow-cure urethane prepolymer is between about 50 to 60%. In some embodiments, the percent weight of the slow-cure urethane prepolymer is between about 45 to 55% (e.g., 50%). In some embodiments, the percent weight of the slow-cure urethane prepolymer is between about 40 to 50%. In some embodiments, the percent weight of the slow-cure urethane prepolymer is between about 35 to 45%. In some embodiments, the percent weight of the slow-cure urethane prepolymer is between about 30 to 40%. In some embodiments, the percent weight of the slow-cure urethane prepolymer is between about 20 to 30%.

In some embodiments, the percent weight of the flexible binder urethane prepolymer is between about 40 to 50%. In some embodiments, the percent weight of the flexible binder urethane prepolymer is between about 30 to 40% (e.g., 35%). In some embodiments, the percent weight of the flexible binder urethane prepolymer is between about 25 to 35%. In some embodiments, the percent weight of the flexible binder urethane prepolymer is between about 20 to 30%. In some embodiments, the percent weight of the flexible binder urethane prepolymer is between about 15 to 25%.

In some embodiments, the desired combination of reactivity and hardness properties of the slow-cure prepolymer and flexible binder urethane prepolymer mixture may be achieved by a single urethane prepolymer component (a custom prepolymer) with a suitable % NCO content. In some embodiments, the percent weight of the urethane prepolymer is between about 65 to 75%. In some embodiments, the percent weight of the urethane prepolymer is between about 60 to 70% (e.g., 65%). In some embodiments, the percent weight of the urethane prepolymer is between about 55 to 65%. In some embodiments, the percent weight of the urethane prepolymer is between about 50 to 60%. In some embodiments, the percent weight of the urethane prepolymer is between about 45 to 55%. In some embodiments, the percent weight of the urethane prepolymer is between about 35 to 45%.

Modifying the ratio between the slow-cure urethane prepolymer and the flexible binder urethane prepolymer may allow for varied application and substrate suitability. For example, in some embodiments, the ratio of the flexible binder urethane prepolymer to the slow-cure urethane prepolymer is about 7:10. In some embodiments, the ratio of the flexible binder urethane prepolymer to the slow-cure urethane prepolymer is greater than about 7:10, for example about 4:5, 9:10, 1:1, 6:5, 3:2, etc. Such an increase over the 7:10 ratio may increase flexibility and elongation. In some embodiments, high ratios of flexible binder urethane prepolymer to slow-cure urethane prepolymer (e.g., greater than about 7:10) provides a dry film suitable for use with flooring substrates that demonstrate dimensional properties of expansion and contraction. A softer or more flexible product may also function as a sound abatement system (e.g., for wood flooring installations). In some embodiments, the ratio of the flexible binder urethane prepolymer to the slow-cure urethane prepolymer is less than about 7:10, for example about 3:5, 1:2, 2:5, 3:10, 1:5, 1:10, etc. Such a decrease below the 7:10 ratio may reduce flexibility and may increase modulus and elastic deformation.

In some embodiments, the slow-cure urethane prepolymer comprises urethane, silane, carboxylate, epoxies, polyesters, phenolics, the like, or a combination thereof. The prepolymers are not limited to the aforementioned examples. In some embodiments, the urethane prepolymer is substituted with a polycarboxylate (e.g., to create a silane end-capped polycarboxylate).

In some embodiments, the flexible binder urethane prepolymer is substituted with a high molecular weight (e.g., greater than about 4,000 g/mol) polyether polyol. The polyether polyol may help increase adhesive flexibility. For example, in some embodiments, the polyether polyol increases elongation and flexible adhesion yet maintains formulation stability. The polyether polyol may help provide a dry film suitable for use with flooring substrates that demonstrate dimensional properties of expansion and contraction. A softer or more flexible product may also function as a sound abatement system (e.g., for wood flooring installations). A softer or more flexible product may also produce an adhesive bond line that holds carpet tile firmly yet allows removal via peeling the floor back (e.g., at a severe angle) creating cohesive failure of the adhesive.

Altering the ratio to incorporate more of higher functionality urethane creates hard setting adhesives suitable for applications including masonry, concrete anchoring, and concrete laminates. Due to the hydrophobic silanol-bridge bonding mechanism, the present invention exhibits excellent exterior stability to changes in humidity and temperature. Harder setting variants of the formulation provide maximum bond strengths to flexible substrates.

Rubber flooring materials exhibit flexibility and excellent wear properties, but may be susceptible to effects associated with osmotic activity. Rubber has low vapor permeability. When coupled with sub slab moisture vapor emissions, vapor may condense at the bond line between flooring and concrete (which can ultimately cause osmotic blister formation). The present invention provides a hydrophobic bond line that repels liquid moisture effectively preventing osmotic events. The present invention is not solely contained at the concrete to flooring interface and penetrates the concrete, covalently bonding to either substrate forming a concrete to flooring material interface that is more intimate than conventional adhesive materials.

In some embodiments, the amino-functional alkoxysilane used to react with the urethane prepolymers is gamma-aminopropyltrimethoxysilane. In some embodiments, the percent weight of the amino-functional alkoxysilane is between about 1 and 5% (e.g., 1.5%).

In some embodiments, the silane, e.g., the alkoxysilane (e.g., amino-functional alkoxysilanes, gamma-aminopropyltrimethoxysilane), comprises benzylamino, chloropropyl, epoxy, epoxy/melamine, ureido, vinyl-benzyl-amino, the like, or a combination thereof. The alkoxysilane is not limited to the aforementioned examples.

In some embodiments, the aliphatic metal catalyst is dibutyltindilaurate. In some embodiments, the percent weight of the aliphatic metal catalyst is between about 0.05 to 5% (e.g., 0.1%).

In some embodiments, the aliphatic metal catalyst comprises dibutyltindilaurate, organometallic compounds based on mercury, lead, tin, bismuth, zinc, the like, or a combination thereof.

In some embodiments, the aliphatic hydrocarbon quenching agent is an aliphatic fatty acid ester mixture. In some embodiments, the percent weight of the aliphatic hydrocarbon quenching agent is between about 15 to 25%. In some embodiments, the percent weight of the aliphatic hydrocarbon quenching agent is between about 10 to 20%. In some embodiments, the percent weight of the aliphatic hydrocarbon quenching agent is between about 5 to 15% (e.g., 10%).

In some embodiments, the percent weight of the aliphatic hydrocarbon quenching agent is between about 2 to 10%.

The reinforcing extender (e.g., calcium carbonate) can help build viscosity. In some embodiments, the percent weight of the reinforcing extender (e.g., calcium carbonate) is between about 20 to 30%. In some embodiments, the percent weight of the reinforcing extender (e.g., calcium carbonate) is between about 15 to 25%. In some embodiments, the percent weight of the reinforcing extender (e.g., calcium carbonate) is between about 10 to 20% (e.g., 15%). In some embodiments, the percent weight of the reinforcing extender (e.g., calcium carbonate) is between about 5 to 10%.

The thixotropic agent can function as a thickener and/or to build viscocity. In some embodiments, the percent weight of the thixotropic agent is between about 20 to 30%. In some embodiments, the percent weight of the thixotropic agent is between about 15 to 25%. In some embodiments, the percent weight of the thixotropic agent is between about 10 to 20% (e.g., 15%). In some embodiments, the percent weight of the thixotropic agent is between about 5 to 10%.

In some embodiments, the adhesive of the present invention comprises a moisture scavenger. In some embodiments, the moisture scavenger comprises vinyltrimethoxysilane. The moisture scavenger may help to limit the amount of moisture contamination absorbed from the atmosphere.

In some embodiments, the adhesive of the present invention comprises an adhesion promoter. For example, in some embodiments, the adhesion promoter comprises glycidoxypropyltrimethoxysilane. Glycidoxypropyltrimethoxysilane is an epoxy group with a three-member ring under heavy stress due to stressed bond angles. Glycidoxypropyltrimethoxysilane finds unsaturated sites and reacts to provide potential excess silane to increase the likelihood of the silanol-bridge bonding mechanism between the adhesive and the substrate. In some embodiments, the percent weight of the glycidoxypropylmethoxysilane is between about 0.1 and 1% (e.g., 0.35%).

Table 5 describes non-limiting examples of properties of a slow-cure urethane prepolymer and a flexible binder urethane prepolymer. A single slow-cure urethane prepolymer possessing properties similar to the mixture of the two components could be used.

TABLE 5

| | Fn | Sp Gravity @ 25° C. | % NCO | Eq Wt | Viscosity cps @ 25° C. |
|---|---|---|---|---|---|
| Slow-cure urethane prepolymer | 2.54 | 1.12 | 15.8 | 266 | 3400 |
| Flexible binder urethane prepolymer | 2.00 | 1.10 | 9.7 | 433 | 2000 |

Components of the adhesive of the present invention may be mixed in sequence (e.g., under high speed dispersion, in an open tank configuration, etc.). As defined in the CRC Publishing's *Coatings Technologies Handbook* 3$^{rd}$ *Edition,* high speed dispersion is a type of mixing wherein solids are dissolved in a liquid by suctioning the solid and liquid mixture into a disc rotating at high speeds (http://www.hockmeyer-.com/technical/publications/73-dispersion-tips-help.html.). In some embodiments, external humidity levels are below about 70%.

The present invention also features modifications to flooring materials to promote chemical bond and increase adhesive strength (e.g., see FIG. 2). Without wishing to limit the present invention to any theory or mechanism, it is believed that incorporating adhesion promoters in the composition of the flooring material backing may improve the performance and moisture resistance of the flooring material. In combination with the adhesive of the present invention, the flooring material may better resist the effects of elevated moisture exposure, creating a waterproof flooring installation. The adhesive may function to mitigate the moisture alone and develop a permanent waterproof bond in concert with the modified flooring material.

The hydrophobic nature of the present invention coupled with adhesive properties may provide an "all-in-one" moisture mitigation/adhesive solution to flooring installation.

As used herein, the term "about" refers to plus or minus 10% of the referenced number. For example, an embodiment wherein the percent weight of the slow-cure urethane prepolymer is about 50% includes a percent weight between 45 and 55%.

EXAMPLE 1

Below is a non-limiting example of a slow-cure urethane prepolymer (Table 6). Equivalents or substitutes are within the scope of the present invention.

Slow-Cure Urethane Prepolymer—polyisocyantate prepolymer based on diphenylmethane diisocyanate (MDI). High functionality (Fn) and NCO content gives increased reactivity to this component. On its own this prepolymer will form highly rigid films and must be modified for proper application requirements.

TABLE 6

SLOW-CURE URETHANE PREPOLYMER SPECIFICATIONS

| Property | Value |
|---|---|
| NCO content, % | 15.0-18.0 |
| Viscosity @ 25 C., cps | 3000-8000 |
| Appearance | Brown liquid |
| Eq wt | 250-270 |
| Fn | 2.5-2.55 |

EXAMPLE 2

Below is a non-limiting examples of a flexible binder urethane prepolymer (Table 7). Equivalents or substitutes are within the scope of the present invention.

Flexible Binder Urethane Prepolymer—polyisocyanate prepolymer based on diphenylmethane diisocyanate (MDI). Lower functionality and NCO content makes this prepolymer less reactive and slower curing. Higher equivalent weight gives this component additional flexibility and gap bridging properties.

TABLE 7

FLEXIBLE BINDER URETHANE SPECIFICATIONS

| Property | Value |
|---|---|
| NCO content, % | 7.0-0.0 |
| Viscosity @ 25 C., cps | 1500-3500 |
| Appearance | Clear liquid |
| Eq wt | 425-550 |
| Fn | 2.00 |

EXAMPLE 3

Below is a non-limiting examples of an aliphatic hydrocarbon quencher (Table 8). Equivalents or substitutes are within the scope of the present invention.

Aliphatic Fatty Acid Ester Mixture—a UV stable, zero VOC solvent having low viscosity, possessing high flash point and low volatility. This solvent readily biodegrades in the environment (>90% in 28 days). This solvent is not derived from petroleum distillates, is non-toxic, non-hazardous under RCRA, non-HAPS and meets clean air solvent certification. Aliphatic Fatty Acid Ester Mixture is sold under various trade names, for example: Solvation (Shepard Bros, La Habra, Calif.) and Promethean ME (Promethean Biofuels, Temecula, Calif.). Methyl esters can be produced from a variety of raw materials such as fats and plant oils. Common resources for methyl ester manufacture are coconut, palm, canola and rapeseed oils, recycled vegetable oils, and beef tallow.

TABLE 8

FLEXIBLE BINDER URETHANE SPECIFICATIONS

| Property | Value |
| --- | --- |
| Specific Gravity (25 C.) | 0.885-0.905 |
| Water Solubility | Insoluble |
| Appearance | Clear, Thin Liquid |
| Flash Point | 266 F. (130 C.) |
| KB Value | 58 |

EXAMPLE 4

Method of Production

The following is an example of method of producing a composition of the present invention. Components of the adhesive of the present invention may be mixed in sequence (e.g., under high speed dispersion, in an open tank configuration, etc.). In some embodiments, external humidity levels are below about 70%.

1. Add 50% wt. (by weight of total formulation) slow-cure urethane prepolymer with 15.8% NCO content.
2. Add and continuously blend 35% wt. flexible binder urethane prepolymer with 9.7% NCO content.
3. Add and continuously blend 1.5% wt. gamma-aminopropyltrimethoxysilane.
4. Add and continuously blend 0.1% wt. dibutyltinlaurate to catalyze the reaction.
5. Allow components 1-4 to blend thoroughly (approximately 15-20 minutes).
6. Add and continuously blend 10% wt. mixture of aliphatic fatty acid ester (non-petroleum base) to quench the urethane reaction.
7. Add and continuously blend 0.7% wt. vinyltrimethoxysilane to scavenge potential atmospheric humidity (from open tank configuration).
8. Add and continuously blend 15% wt. surface-treated natural calcium carbonate reinforcing extender to add body to the formulation and build viscosity.
9. Add and continuously blend 15% wt. surface treated fumed silicate to achieve "high viscosity with low shear, and low viscosity with high shear" appropriate for trowel application.
10. Add and continuously blend 0.35% wt. 3-glycidoxypropyltrimethoxysilane.
11. Add and continuously blend 0.2% wt. pigment to achieve desired aesthetics.

Various modifications of the invention, in addition to those described herein, will be apparent to those skilled in the art from the foregoing description. Such modifications are also intended to fall within the scope of the appended claims. Partially end capped, silane modified moisture-cure urethane blend having a content percentage ratio of free reacting urethane and silane endcapped urethane of approximately 1:4 (25% free urethane to 75% silane end-capped urethane). This ratio can vary dependent upon final cure response. Higher free urethane content provides for a faster more reactive final formulation suitable for applications requiring more immediate cure such as concrete anchoring. Higher end capped ratios provide slower reactivity allowing for broad field application of adhesive more suited to flooring installations. The synergistic physical formulation is a hydrolytically stable suspension of the previously described modified urethane component blend in a hydrophobic carrier, having the final viscosity adjusted with hydrophobically modified organic and inorganic viscosifiers. This final reactive formulation is a careful non-stoichiometric balance of reagents, held in suspension by the hydrophobic carrier, that when exposed to moisture functionally repels liquid water yet allows water vapor (restricted reagent) to react and fulfill the kinematic restriction found in the reaction simplex.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A method of producing a polymeric matrix adhesive, said method comprising:
   a) providing a silane end-capped polymeric mixture, wherein the silane end-capped polymeric mixture comprises a silane end-capped prepolymer urethane, wherein the silane end-capped prepolymer urethane is produced by combining a silane and a prepolymer urethane, wherein the prepolymer urethane has an average NCO content of between about 9 to 16;
   b) adding an aliphatic quencher;
   c) adding reinforcing extender; and
   d) adding a thixotropic agent;
wherein the prepolymer urethane comprises a slow-cure urethane prepolymer having a functionality (Fn) between about 2.5 and 2.55 and an NCO content between about 15 to 18%, and a flexible binder urethane prepolymer having a functionality (Fn) of about 2 and an NCO content between about 7 and 10%;
wherein the method produces the polymeric matrix adhesive such that the polymeric matrix adhesive is waterproof and pH-resistant.

2. The method of claim 1, wherein the method comprises mixing (a), (b), (c), and (d) under high speed dispersion.

3. The method of claim 1, wherein a catalyst is combined with the silane and the prepolymer urethane.

4. The method of claim 3, wherein the catalyst comprises an aliphatic metal catalyst.

5. The method of claim 4, wherein the catalyst comprises dibutyltindilaurate.

6. The method of claim 1, wherein the silane comprises an amino-functional alkoxysilane.

7. The method of claim 6, wherein the silane comprises a gamma-aminopropyltrimethoxysilane.

8. The method of claim 1, wherein the aliphatic quencher comprises an aliphatic fatty acid ester.

9. The method of claim 1, wherein the reinforcing extender comprises calcium carbonate.

10. The method of claim 1, wherein the thixotropic agent comprises silicate.

11. The method of claim 1, wherein the method further comprises adding a moisture scavenger.

12. The method of claim 11, wherein the moisture scavenger comprises vinyltrimethoxysilane.

* * * * *